UNITED STATES PATENT OFFICE.

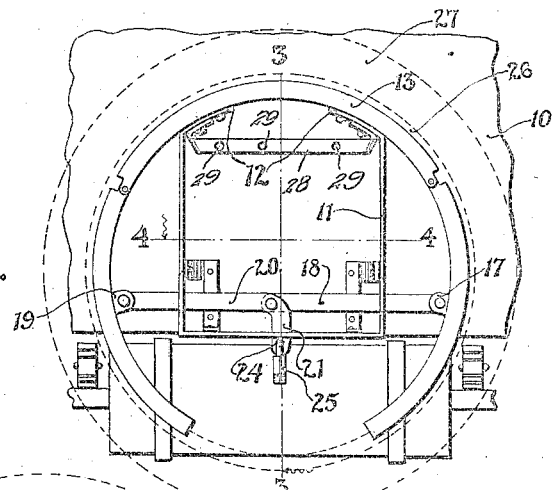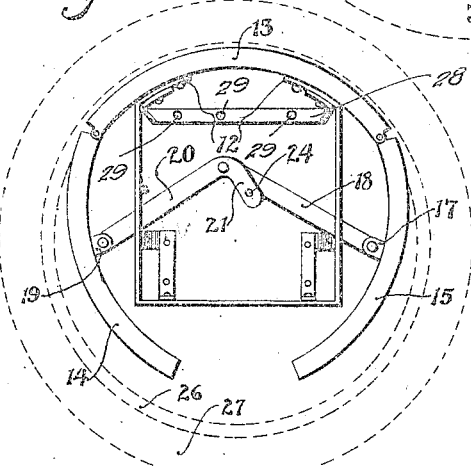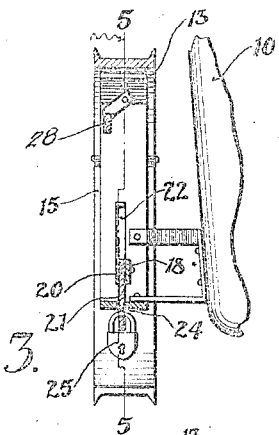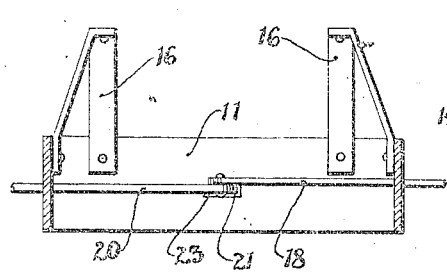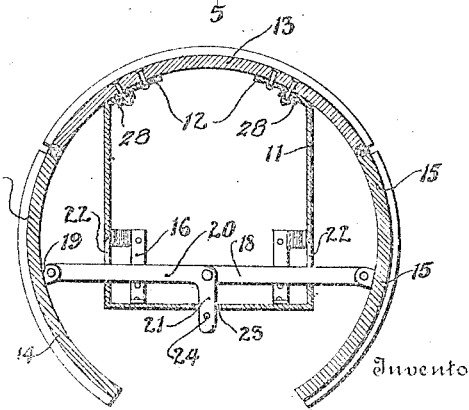

HARLEY D. JACKSON, OF WEST DULUTH, MINNESOTA.

TIRE-HOLDER.

1,277,593.

Specification of Letters Patent.

Patented Sept. 3, 1918.

Application filed February 6, 1918. Serial No. 215,641.

*To all whom it may concern:*

Be it known that I, HARLEY D. JACKSON, a citizen of the United States, residing at West Duluth, in the county of St. Louis, State of Minnesota, have invented certain new and useful Improvements in Tire-Holders; and I do hereby declare the following to be a full, clear, and exact description of the invention, such as will enable others skilled in the art to which it appertains to make and use the same.

This invention relates to improvements in tire holders and particularly to devices for holding a spare tire and rim on the back of an automobile.

The principal object of the present invention is to provide a device of this character wherein the holder is effective to prevent the theft of the tire.

Another object is to provide an improved bracket for the tire holder which coöperates with the holder to lock the tire against being removed by an unauthorized person.

Other objects and advantages will be apparent from the following description when taken in connection with the accompanying drawing.

In the drawing:

Figure 1 is a rear end view of a portion of an automobile showing my tire holder in position thereon.

Fig. 2 is a similar view showing the holder in position to receive a tire or to permit the tire to be removed.

Fig. 3 is a vertical sectional view taken on the line 3—3 of Fig. 1.

Fig. 4 is a horizontal sectional view taken on the line 4—4 of Fig. 1.

Fig. 5 is a vertical sectional view taken on the line 5—5 of Fig. 3.

Referring particularly to the accompanying drawing, 10 represents the back of an automobile which supports the tire holder.

A substantially angular U-shaped member 11 is disposed at the rear of the body of the automobile and has the upper ends of its arms turned inwardly and upwardly in longitudinally curved contour, as shown at 12. An upwardly arched and externally channeled member 13 is disposed on and is secured to the curved portions 12. Pivotally connected to the opposite ends of the member 13 are the similarly shaped members 14 and 15. The other ends of these members 14 and 15 are unconnected, as shown.

Carried by the arms of the member 11, and also connected to the transverse portion thereof, are the angle members 16 which are formed to be secured to the back of the automobile. Carried by the inner face of the section 15 is a pair of parallel apertured lugs 17, and pivotally supported between these lugs is the end of a link 18. A similar pair of lugs 19 is carried by the section 14, and pivotally supported between this pair of lugs is the end of a lever 20, the other end being formed with an angularly extending hand grip portion 21. Said hand grip portion is pivotally connected to the adjacent end of the link 18. The arms of the member 11, adjacent their lower ends, are formed with vertical slots 22 through which the lever and link are adapted to slide in their vertical operative movements. In the center of the transverse portion of the member 11 there is formed a slot 23 through which the hand grip portion of the lever 20 is adapted to pass, the extremity of said portion being formed with an opening 24 for the reception of the shackle of the padlock 25. This opening 24, when the device is in the position of Fig. 1, is disposed below the transverse member of the element 11, whereby upward movement of the lever and link is effectively prevented and the rim 26, with the tire 27 thereon, held securely in the channels of the members 13, 14, and 15.

When it is desired to remove the tire, or to place one on the holder, the grip portion is grasped and swung upwardly, after first having removed the padlock 25. This movement draws the sections 14 and 15 inwardly toward each other so that the rim of the spare tire may be easily and quickly lifted from the channeled members.

Thus the bracket serves to support the sections of the holder and also as a guide for the lever and link, as well as to provide means for locking the lever against movement.

Secured between the upper ends of the arms 11, is a yoke member 28, the transverse portion of which is formed with the openings 29 for the bolts (not shown) of a license plate, and the opening for attachment of the tail light (not shown).

What is claimed is:

A tire holder including a number of hinged tire holding sections, one of the sections being immovable, a bracket carried by the immovable section and secured to the automobile, pivotally connected members pivotally mounted on the movable sections, one of the members being formed with an apertured projection, said bracket being slotted for the reception of the said members, said bracket being formed with a slot for the reception of the apertured portion of the pivotally connected member, and means for engagement with said apertured projection to hold the members against movement.

In testimony whereof, I affix my signature in the presence of two witnesses.

HARLEY D. JACKSON.

Witnesses:
BERTHA C. CATROM,
M. J. DOYLE.